(12) United States Patent
Esquibel et al.

(10) Patent No.: US 9,776,679 B2
(45) Date of Patent: Oct. 3, 2017

(54) ACCESSORY ASSEMBLY OF BICYCLE AND MOUNTING DEVICE OF THE ACCESSORY ASSEMBLY

(71) Applicant: Lee Chi Enterprises Company Ltd., Changhua (TW)

(72) Inventors: Colin Esquibel, Changhua (TW); Hong-Min Li, Changhua (TW)

(73) Assignee: LEE CHI ENTERPRISES COMPANY LTD., Changhua (TW)

( * ) Notice: Subject to any disclaimer, the term of this patent is extended or adjusted under 35 U.S.C. 154(b) by 157 days.

(21) Appl. No.: 14/451,853

(22) Filed: Aug. 5, 2014

(65) Prior Publication Data
US 2016/0039485 A1    Feb. 11, 2016

(51) Int. Cl.
*B62J 11/00* (2006.01)
*B62K 19/30* (2006.01)
*B62K 21/26* (2006.01)
*B62K 23/06* (2006.01)

(52) U.S. Cl.
CPC .............. *B62J 11/00* (2013.01); *B62K 19/30* (2013.01); *B62K 21/26* (2013.01); *B62K 23/06* (2013.01)

(58) Field of Classification Search
CPC .. B62J 11/00; B62J 7/06; B62K 23/06; B62K 21/26; B62K 19/30
USPC ... 248/420, 214, 218.4, 219.3, 219.4, 316.1; 74/551.1, 551.8, 469; 280/288.4; 224/420, 425, 427, 431, 441
See application file for complete search history.

(56) References Cited

U.S. PATENT DOCUMENTS

| 1,911,380 | A | * | 5/1933 | McFarlin | H01B 17/16 174/158 R |
| 1,919,767 | A | * | 7/1933 | Bohlman | H01F 27/06 248/316.1 |
| 2,151,768 | A | * | 3/1939 | Humeston | F41G 11/003 248/229.13 |
| 2,531,902 | A | * | 11/1950 | Baron | B62J 7/00 224/425 |
| 2,716,533 | A | * | 8/1955 | Freeman | A47F 5/04 211/107 |
| 2,803,880 | A | * | 8/1957 | Weaver | F41G 11/002 16/221 |
| 3,040,433 | A | * | 6/1962 | Heinzel | F41G 11/002 248/316.1 |
| 3,364,782 | A | * | 1/1968 | Freeland | B62K 23/06 280/236 |

(Continued)

*Primary Examiner* — Justin Larson
*Assistant Examiner* — Phillip Schmidt
(74) *Attorney, Agent, or Firm* — Tracy M. Heims; Apex Juris, pllc.

(57) ABSTRACT

A mounting device for mounting accessories on a handlebar of a bicycle includes a mounting frame and a plurality of sliding members. The mounting frame has a central hole and a plurality of coupling slots. The handlebar is inserted into the central hole of the frame member, and the coupling slots are provided on a surface of the mounting frame. The coupling slots each have an elongated direction, which is substantially parallel to an axial direction of the frame member, and the coupling slots are substantially parallel to each other. Accessories are connected to the sliding members respectively, and the sliding members each have a coupling portion to be detachably engaged in one of the coupling slots of the mounting frame.

11 Claims, 11 Drawing Sheets

(56) References Cited

U.S. PATENT DOCUMENTS

| | | | | |
|---|---|---|---|---|
| 3,734,438 A * | 5/1973 | Kautz | H02B 5/02 | 211/107 |
| 4,117,629 A * | 10/1978 | Ekdahl | A01G 9/02 | 211/107 |
| 4,366,922 A * | 1/1983 | Levine | B62J 11/00 | 224/414 |
| 4,541,555 A * | 9/1985 | Miree | B62J 6/00 | 224/420 |
| 4,726,252 A * | 2/1988 | Dawson | B62K 23/06 | 188/265 |
| 4,840,337 A * | 6/1989 | Zaugg | B62J 6/02 | 248/115 |
| 4,934,644 A * | 6/1990 | Nagy | H02G 3/105 | 24/339 |
| 5,287,765 A * | 2/1994 | Scura | B62K 23/06 | 74/489 |
| 5,312,077 A * | 5/1994 | Gutierrez | A01K 97/10 | 248/214 |
| 5,375,748 A * | 12/1994 | Katz | B62J 11/00 | 224/420 |
| 5,386,961 A * | 2/1995 | Lu | B62H 5/00 | 224/425 |
| 5,419,154 A * | 5/1995 | Christoff | A45F 3/16 | 220/709 |
| 5,484,128 A * | 1/1996 | Franco, Sr. | B62J 11/00 | 224/274 |
| 5,522,527 A * | 6/1996 | Tsai | B62J 29/00 | 224/414 |
| 6,186,383 B1 * | 2/2001 | Kobdish | B62J 6/00 | 224/420 |
| 6,206,258 B1 * | 3/2001 | Calder | B62J 11/00 | 224/251 |
| 6,270,124 B1 * | 8/2001 | Nanko | B62M 9/135 | 24/274 WB |
| 6,328,268 B1 * | 12/2001 | Irie | B62J 99/00 | 248/214 |
| 6,527,240 B1 * | 3/2003 | Huang | A47G 23/0225 | 248/218.4 |
| 6,676,095 B2 * | 1/2004 | Dal Pra' | B62J 1/08 | 24/20 LS |
| 6,712,541 B1 * | 3/2004 | Henricksen | B62K 21/04 | 403/286 |
| 6,938,865 B1 * | 9/2005 | Day | B60R 11/02 | 248/229.14 |
| 7,780,321 B1 * | 8/2010 | Retief | B62J 6/02 | 362/474 |
| 8,006,944 B2 * | 8/2011 | Ueda | B62J 6/00 | 248/214 |
| 8,240,528 B2 * | 8/2012 | Barnes | B62J 11/00 | 224/419 |
| 8,348,296 B2 * | 1/2013 | Taiga | B62J 11/00 | 224/420 |
| 2002/0096610 A1 * | 7/2002 | Fernandez | G09F 7/18 | 248/218.4 |
| 2004/0149878 A1 * | 8/2004 | Gierke | B62H 3/04 | 248/316.1 |
| 2005/0109808 A1 * | 5/2005 | Ueda | B62J 11/00 | 224/420 |
| 2005/0151040 A1 * | 7/2005 | Hsu | B62J 6/00 | 248/214 |
| 2007/0108244 A1 * | 5/2007 | Chuang | B62J 9/003 | 224/420 |
| 2007/0235607 A1 * | 10/2007 | Liaw | F16M 13/02 | 248/218.4 |
| 2008/0298886 A1 * | 12/2008 | Chen | B62K 19/36 | 403/373 |
| 2010/0051768 A1 * | 3/2010 | Yang | B62J 11/00 | 248/219.3 |
| 2010/0102185 A1 * | 4/2010 | Jenestreet | F16B 12/42 | 248/218.4 |
| 2011/0051442 A1 * | 3/2011 | Chang | B62J 6/005 | 362/474 |
| 2011/0062199 A1 * | 3/2011 | Liu | B62J 7/06 | 224/420 |
| 2011/0083525 A1 * | 4/2011 | Hirose | B60T 7/08 | 74/501.6 |
| 2011/0197542 A1 * | 8/2011 | O'Toole | E04H 17/22 | 52/741.14 |
| 2013/0193289 A1 * | 8/2013 | Goffman | B62J 11/00 | 248/231.51 |
| 2014/0058578 A1 * | 2/2014 | Tetsuka | B62L 3/02 | 701/1 |

\* cited by examiner

ACCESSORY ASSEMBLY OF BICYCLE AND MOUNTING DEVICE OF THE ACCESSORY ASSEMBLY

BACKGROUND OF THE INVENTION

1. Field of the Invention

The present invention relates generally to an accessory of bicycle, and more particularly to an accessory assembly of bicycle and a mounting device of the accessory assembly.

2. Description of the Related Art

Basically, a bicycle includes a frame, a front fork provided on the frame, a front wheel provided on the front fork, a rear wheel which includes a rear sprocket and is provided on the frame, a crankset which includes a front sprocket and is provided on the frame, a chain winded on the front and the rear sprockets, a handlebar provided on the front fork for steering control, and two brake actuation devices respectively provided on the front fork and the frame at where corresponding to the front and rear wheels, wherein two brake controllers which control the brake actuation devices are respectively provided on the handlebar at where near a left handle and a right handle thereof, and therefore a rider can easily control a control rod of each brake controller with fingers.

In addition to the aforementioned basic components, an advanced type of bicycle further includes a derailleur device, which includes two derailleurs and tow derailleur controllers, wherein the derailleurs are respectively provided on the frame at where corresponding to the front and the rear sprockets, and the derailleur controllers are respectively provided on the handlebar at where near the left handle and the right handle. Therefore a rider can easily control a control rod of each derailleur controller with fingers.

The aforementioned brake controllers and derailleur controllers each have a binding ring to firmly fix the brake controllers and the derailleur controllers on the handlebar, and they can only be arranged in an axial direction of the handlebar. In order to allow a rider to control the control rods of the brake controllers and the derailleur controllers with fingers while holding the handles of the handlebar with both hands, the binding rings of the brake controller and the derailleur controller of the same side have to be placed rather closely, or even adjacently, to each other on the handlebar. But even so, for a rider who has shorter fingers, it would be inconvenient to control the control rods which are farther from the handles.

In addition, since cycling is getting popular nowadays, a wide range of bicycle accessories are now available in the market. These accessories, such as lights, warning lights, bells, cell phone holders, satellite navigators, etc., are typically designed to be attached onto the handlebar of a bicycle, but there might not be enough room for them.

SUMMARY OF THE INVENTION

The primary objective of the present invention is to provide an accessory assembly and a securing device thereof, which mounts accessories on a handlebar of a bicycle in a radial direction of the handlebar to effectively save spaces on the handlebar in an axial direction thereof.

According to the objective of the present invention, the present invention provides a mounting frame connected to a handlebar of a bicycle for mounting accessories thereon. The mounting frame includes a central hole and a plurality of coupling slots. The central hole allows the handlebar to be inserted thereinto, and the coupling slots are provided on a surface of the mounting frame in different radial directions of the central hole. The coupling slots each have an elongated direction, which is substantially parallel to an axial direction of the central hole. Each of the coupling slots allows a bicycle accessory to be engaged therewith.

The present invention further provides a mounting frame connected to a handlebar of a bicycle for mounting accessories to be mounted thereon. The mounting frame includes a main frame and at least two coupling rails. The main frame has a central hole, which allows the handlebar to be inserted thereinto. The at least two coupling rails extend in an axial direction of the main frame, and are arranged in different radial directions of the central hole. Each of the coupling rails has a neck and a head, wherein the neck is connected onto a peripheral surface of the main frame. The coupling rails allow bicycle accessories to be engaged therewith.

The present invention further provides a mounting device for mounting at least two accessories on a handlebar of a bicycle. The mounting device includes a mounting frame and a plurality of sliding members. The mounting frame has a central hole and a plurality of coupling slots, wherein the central hole allows the handlebar to be inserted thereinto, and the coupling slots are provided on a surface of the mounting frame in different radial directions of the central hole. An accessory is mounted on one of the sliding members, wherein each sliding member has a coupling portion to be detachably engaged in one of the coupling slots of the mounting frame.

The present invention further provides an accessory assembly of a bicycle connected to a handlebar of a bicycle. The accessory assembly includes a mounting frame and at least a bicycle accessory. The mounting frame has a central hole and a plurality of coupling slots, wherein the central hole allows a handlebar of a bicycle to be inserted thereinto, and the coupling slots are distributed on the surface of the mounting frame in different radial directions of the central hole. The at least one bicycle accessory has a coupling portion to be detachably engaged in one of the coupling slots of the mounting frame.

Whereby, bicycle accessories can be arranged in different radial directions of the handlebar. Therefore the space on the handlebar in an axial direction thereof is saved, and the handlebar is able to engage more bicycle accessories.

DETAILED DESCRIPTION OF THE INVENTION

Figure 1:
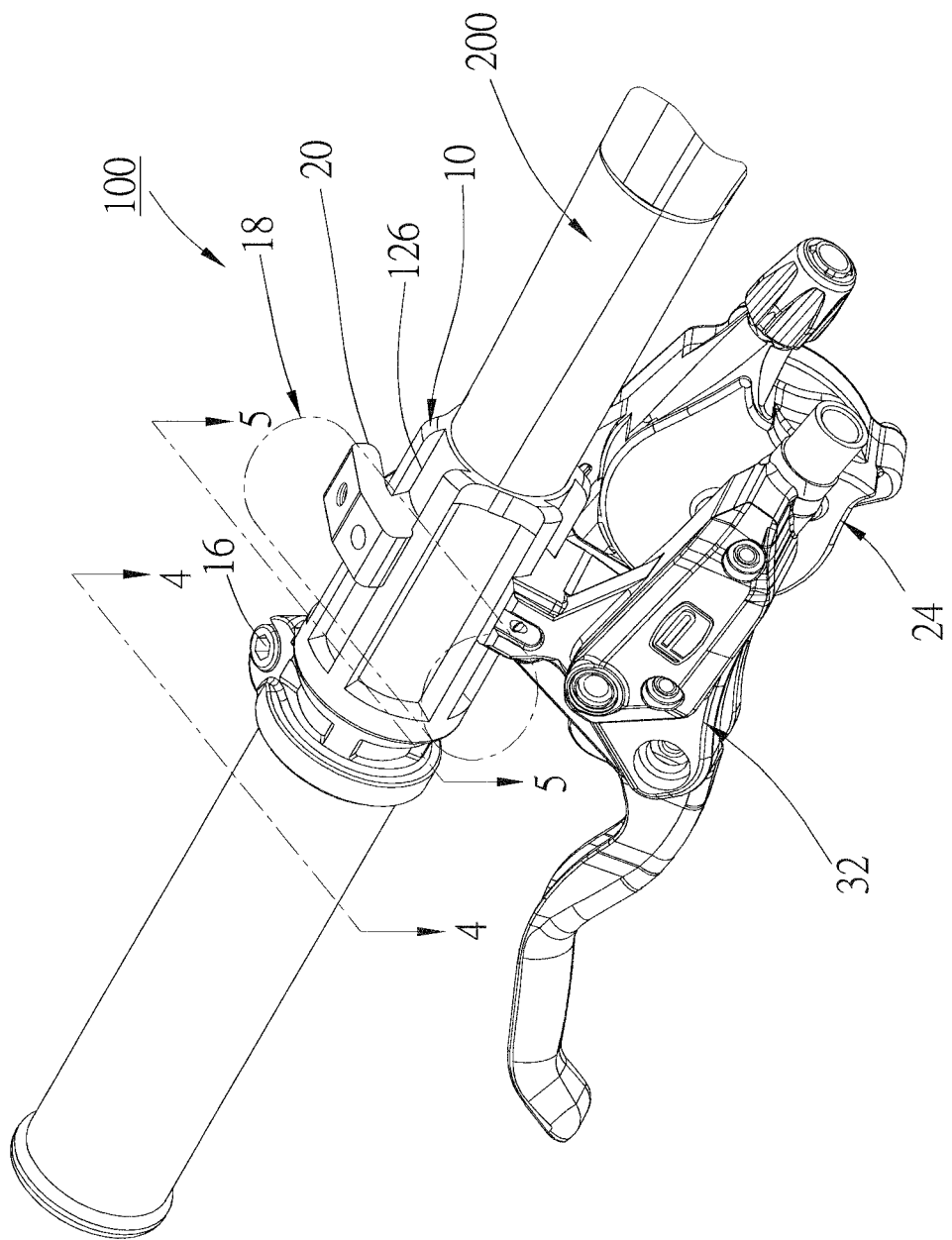
FIG. 1 is a perspective view of the accessory assembly of a first preferred embodiment of the present invention.
Figure 2:
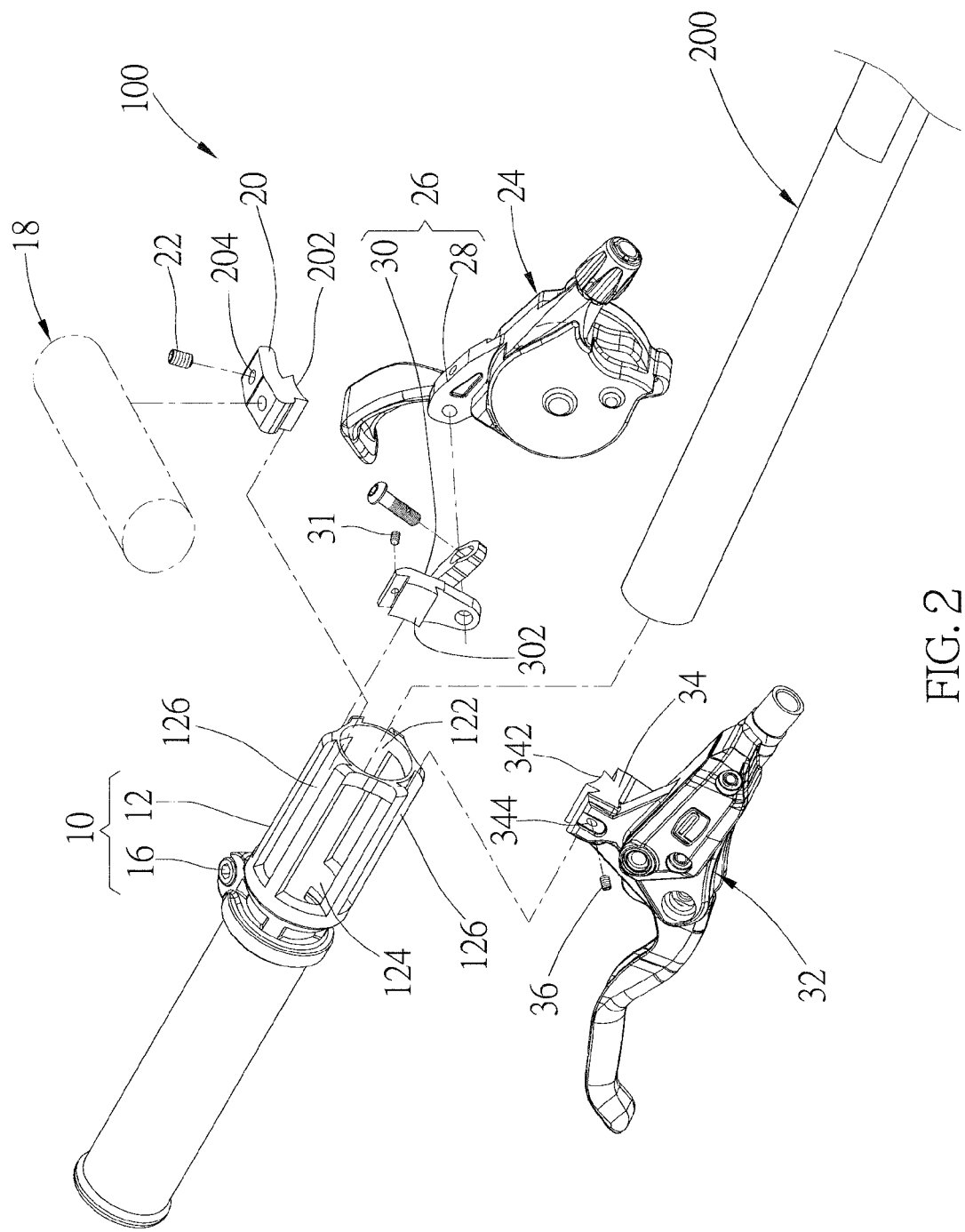
FIG. 2 is an exploded view of the first preferred embodiment of the present invention.

As shown in FIG. 1 and FIG. 2, an accessory assembly 100 of the preferred embodiment of the present invention is mounted on a handlebar 200 of a bicycle (not shown). The accessory assembly 100 includes a mounting frame 10 and a plurality of accessories.

Figure 3:
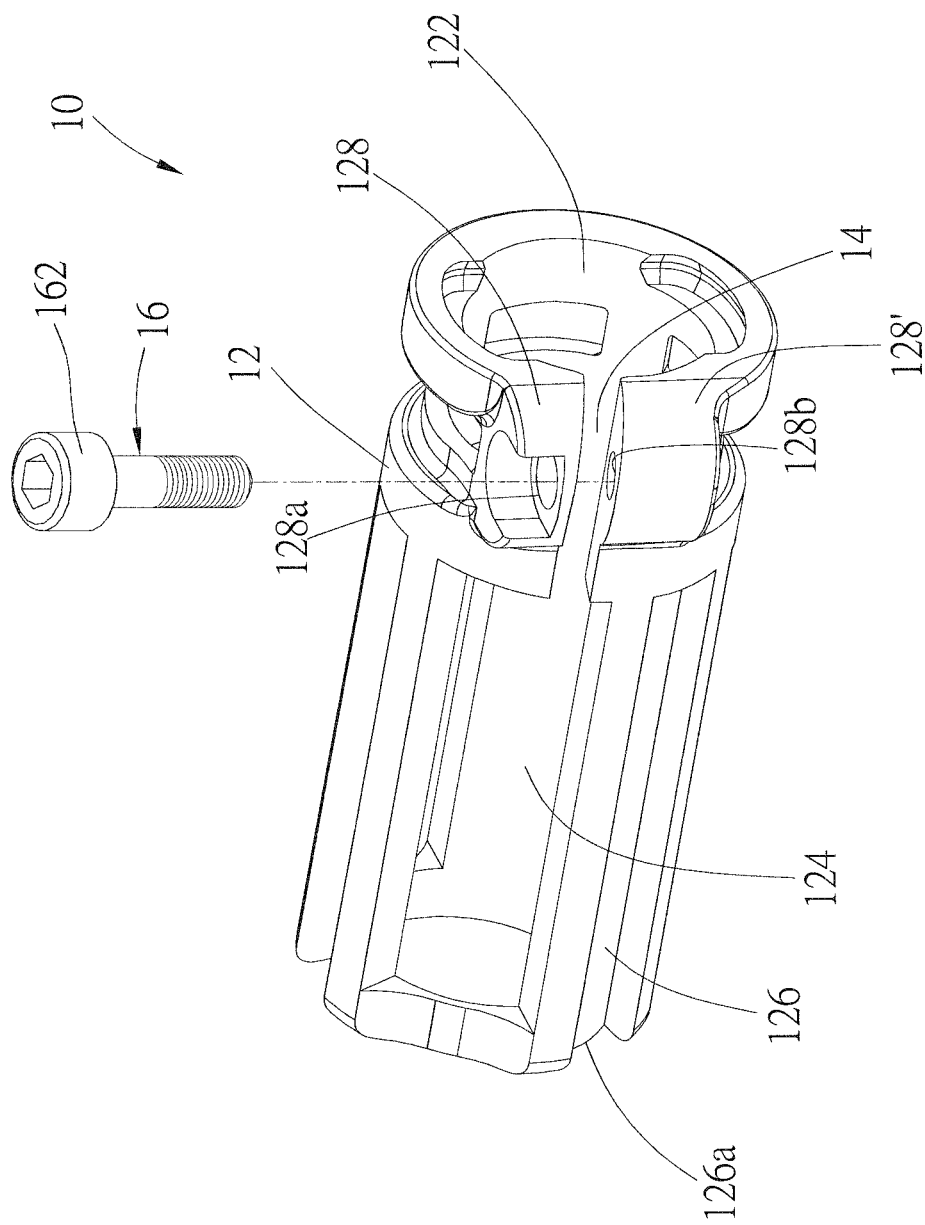
FIG. 3 is a perspective view of the mounting frame of the first preferred embodiment of the present invention.
Figure 4:
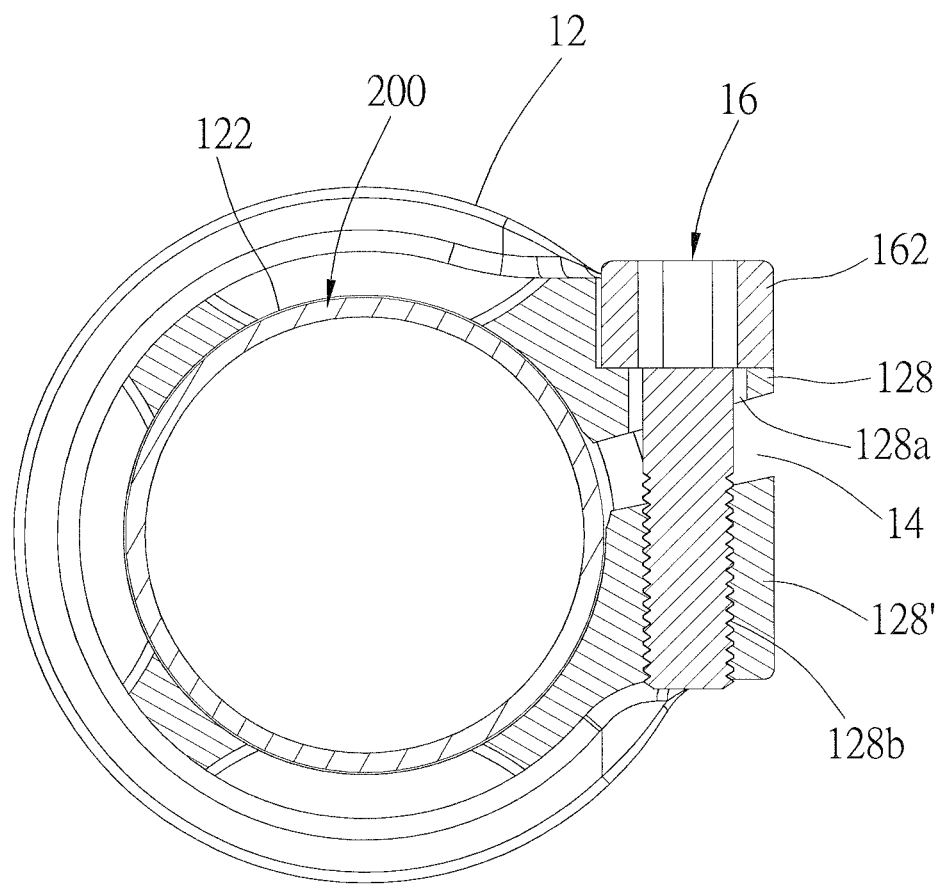
FIG. 4 is a sectional view along the 4-4 line in FIG. 1.
Figure 5:
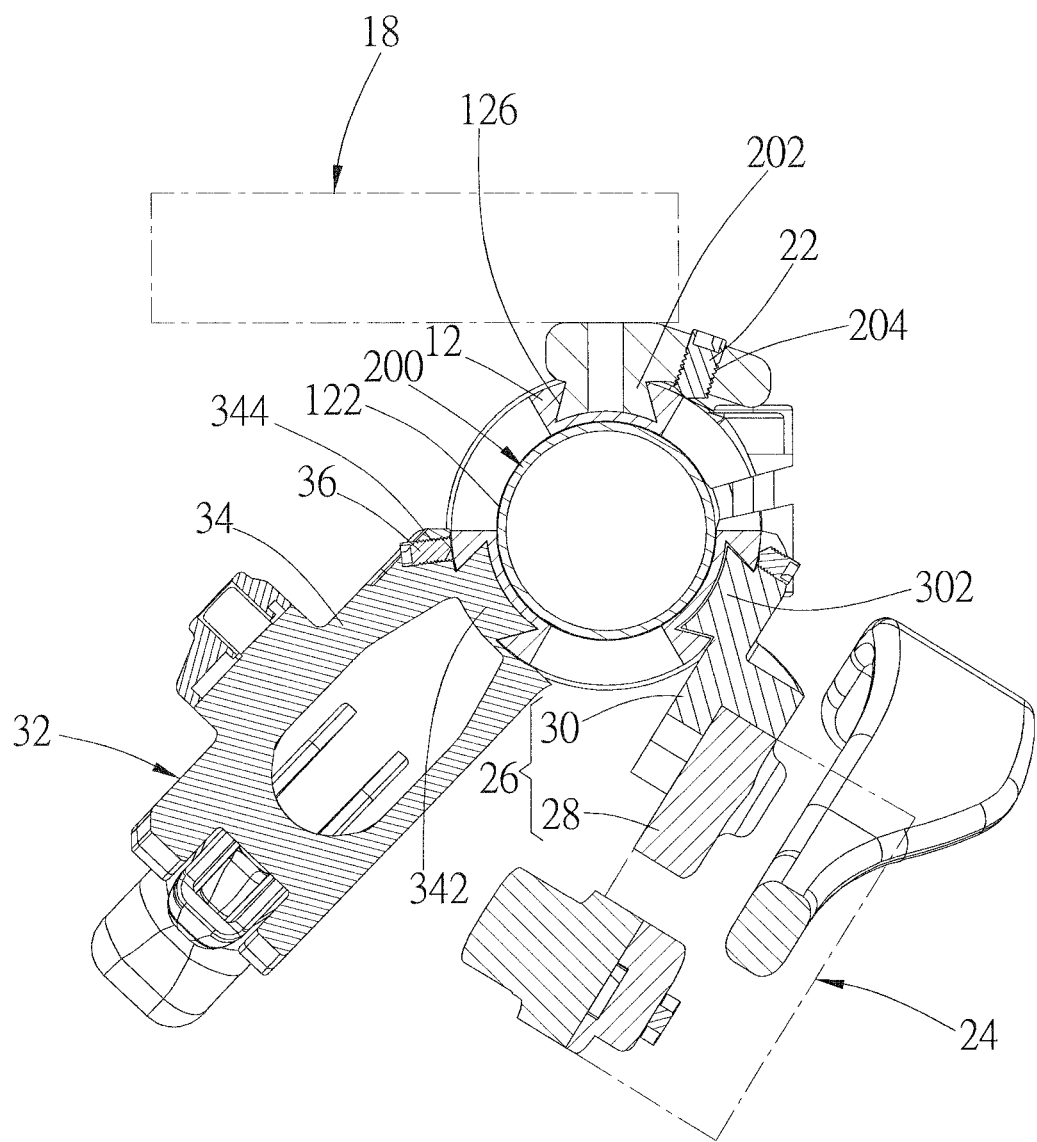
FIG. 5 is a sectional view along the 5-5 line in FIG. 1.

As shown in FIG. 3 and FIG. 4, the mounting frame 10 has a frame member 12 and a pressing member, which is a bolt 16 in the present embodiment. The frame member 12 is a tubular member having a central hole 122 at a center, and the handlebar 200 is able to be inserted into the central hole 122 of the frame member 12. The frame member 12 is further provided with three openings 124, three coupling slots 126, and two holding portions 128, 128'. The openings 124 are on a surface of the frame member 12, and are arranged separately in different radial directions of the central hole 122, wherein the openings 124 extend in an axial direction of the frame member 12, which is an extending line of the center of the frame member 12, and are communicated to the central hole 122. The coupling slots 126 are on the surface also and between each two of the neighboring openings 124, wherein the coupling slots 126 are arranged in different radial directions of the central hole 122. The coupling slots 126 are grooves in the present embodiment without being communicated to the central hole 122. In more details, each of the coupling slots 126 can be divided into an upper portion and a lower portion, wherein a width of the lower portion is wider than that of the upper portion. The coupling slots 126 each have an elongated direction parallel to the axial direction of the frame member 12. The coupling slots 126 are open at an end of the frame member 12, which are defined as open ends. The holding portions 128 are two protrusions projected from the surface of the frame member 12. The frame member 12 has a gap 14 between the holding portions 128, 128', and the gap 14 has opposite ends extending to one of the openings 124 and an end of the frame member 12. The holding portion 128 is provided with a hole 128a thereon, and the other holding portion 128' is provided with a threaded hole 128b.

The bolt 16 has a head 162 and a threaded rod, and the threaded rod is screwed into the threaded hole 128b through the hole 128a. By screwing the bolt 16, the head 162 abuts against the two holding portions 128, 128' to narrow a width of the gap 14, and therefore the frame member 12 can be firmed mounted on the handlebar 200.

The accessories include a light 18 (headlight), a derailleur controller 24, and a brake lever 32. In practices, any accessories which can be mounted on the handlebar 200, such as bells, cell phone holders, and GPS devices, could be incorporated in the present invention.

The light 18 is connected to a sliding member 20, and the sliding member 20 has a coupling portion 202 and a threaded hole 204. The shape of the coupling portion 202 is complementary to the coupling slots 126 on the frame member 12, so that the coupling portion 202 can enter the coupling slot 126 through its open end. The sliding member 20 has an extending portion, on which the threaded hole 204 is provided. While the coupling portion 202 is engaged in the coupling slot 126, the extending portion is over the surface beside the coupling slot 126, and a bolt 22 can be screwed into the threaded hole 204 and presses the surface of the frame member 12 when the coupling portion 202 is moved to a predetermined position. The sliding member 20 is tilted when the bolt 22 is tightened to secure the coupling portion 202 in the coupling slot 126. As a result, the light 18 is firmly mounted on the handlebar 200.

The derailleur controller 24 has a base 26, and the base 26 includes a main body 28 and a sliding member 30. Typically, the main body 28 is a block connected to the derailleur controller 24, and the sliding member 30 is a protrusion projected from the main body 28. The sliding member 30 has a coupling portion 302, which has a shape complementary to the coupling slots 126 of the mounting frame 10. The same as above, the coupling portion 302 is engaged in the coupling slot 126, and a bolt 31 abuts against a surface of the frame member 12 to secure the base 26. As a result, the derailleur controller 24 is firmly mounted on the handlebar 200.

The brake lever 32 has a sliding member 34. The same as above, the coupling portion 32 has a coupling portion 342 to be engaged in the coupling slot 126, and a bolt 36 is screwed into a threaded hole 344 to secure the brake lever 32 on the handlebar 200.

The mounting frame 100 and the sliding members are so called a mounting device to connect the accessories 18, 24 to the handlebar 200, and the accessories 18, 24, and 32 are around the frame member 12. In other words, the accessories 18, 24, and 32 are mounted on the handlebar 200 in parallel, not in series.

Figure 6:
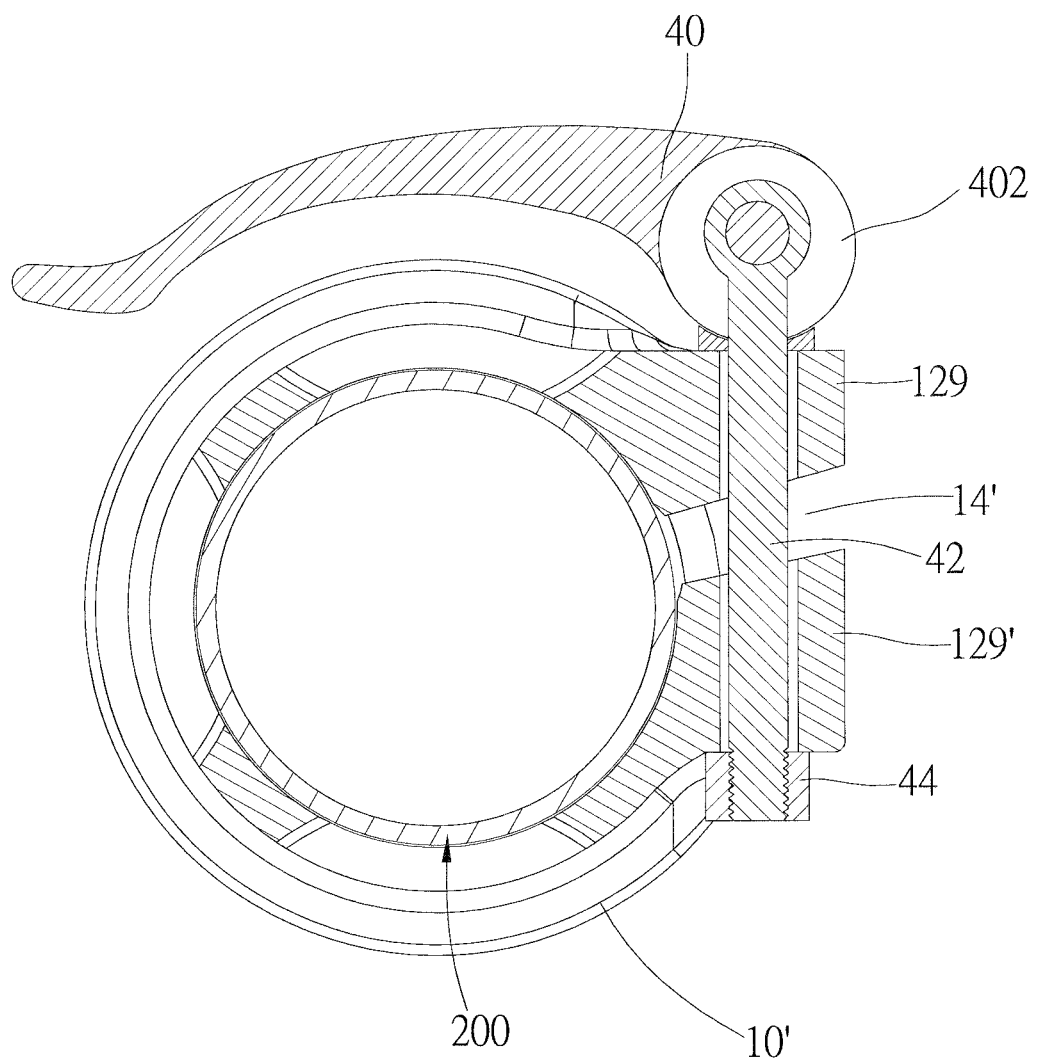
FIG. 6 is a sectional view of a second preferred embodiment of the present invention, showing an alternative pressing member.

FIG. 6 shows an alternative pressing member including a press handle 40 and a connecting rod 42, wherein the press handle 40 has a head 402, which is in a shape of a cylindrical cam. The head 402 is pivotally connected to an end of the connecting rod 42, and abuts against a holding portion 129. Another end of the connecting rod 42 passes through the holding portion 129 and another holding portion 129', and a nut 44 is connected to the connecting rod 42 to abut against the holding portion 129'. A width of a gap 14' between the holding portions 129, 129' is narrowed by pressing the press handle 40 to urge the holding portions 129, 129' to move towards each other. Therefore the mounting frame 10' is firmly mounted on the handlebar 200.

Figure 7:
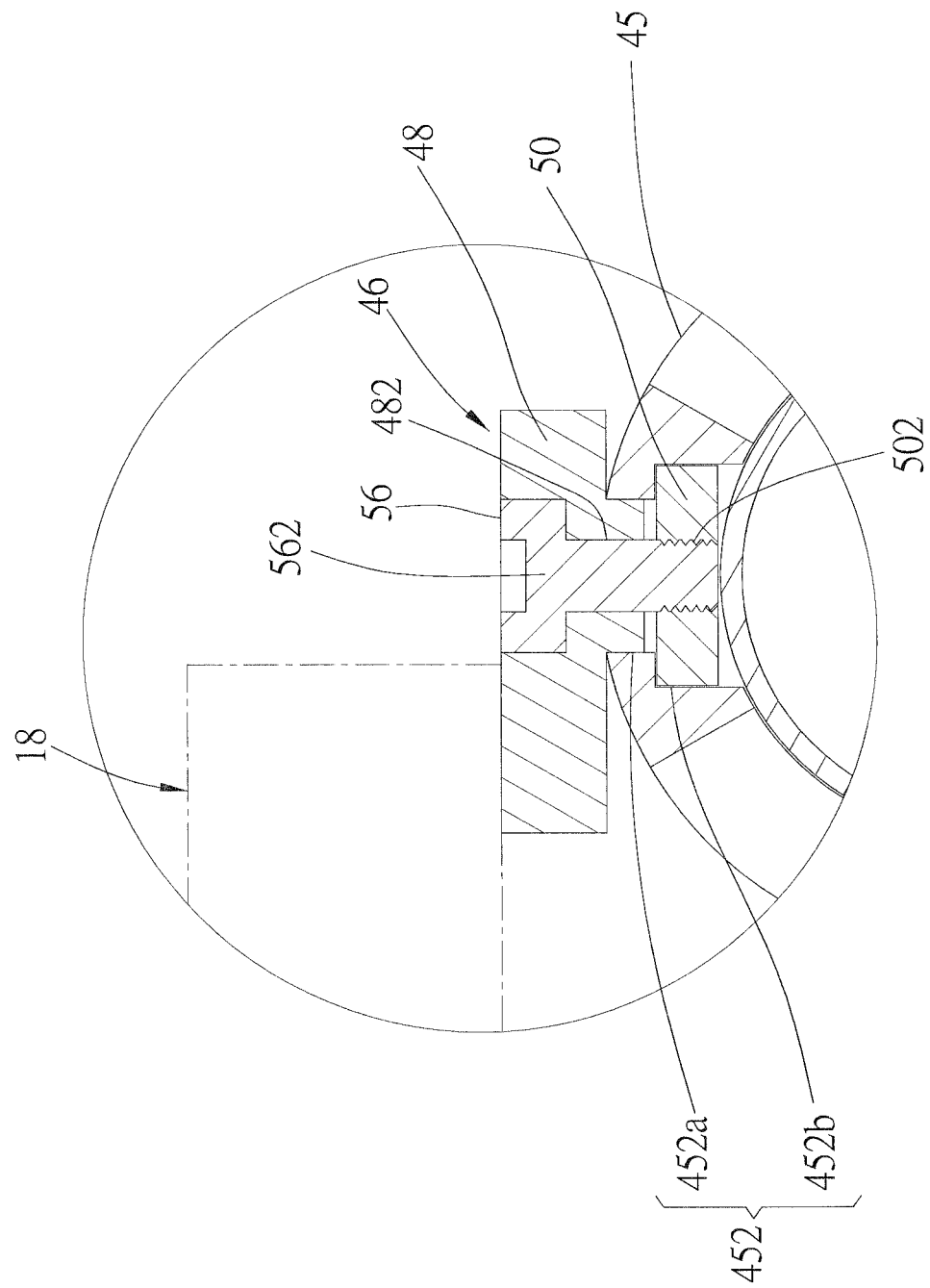
FIG. 7 is a sectional view of a third preferred embodiment of the present invention, showing alternative sliding member and mounting frame.

As shown in FIG. 7, a mounting frame 45 has a coupling slot 452 which can be divided into an upper section 452a and a lower section 452b, wherein the upper section 452a is above the lower section 452b, and the upper section 452a is narrower than the lower section 452b. The sliding member 46 includes a main body 48 and a coupling base 50, wherein the main body 48 has a hole 482, and the coupling base 50 has a threaded hole 502. A part of the main body 48 is exposed out of the coupling slot 452, and a width of said part is wider than that of the upper section 452a. Another part of the main body 48 goes into the upper section 452a, and the coupling base 50 is received in the lower section 452b. A bolt 56 is screwed into the threaded hole 502 of the coupling base 50 through the hole 482 of the main body 48, and a head 562 of the bolt 56 abuts against the main body 48, which urges the part of the main body 48 exposed out of the coupling slot 452 to abut against a peripheral surface of the mounting frame 45. At the same time, the coupling base 50 abuts against walls of the upper section 452a and the lower section 452b, and therefore the mounting frame 45 is firmly mounted.

Figure 8:
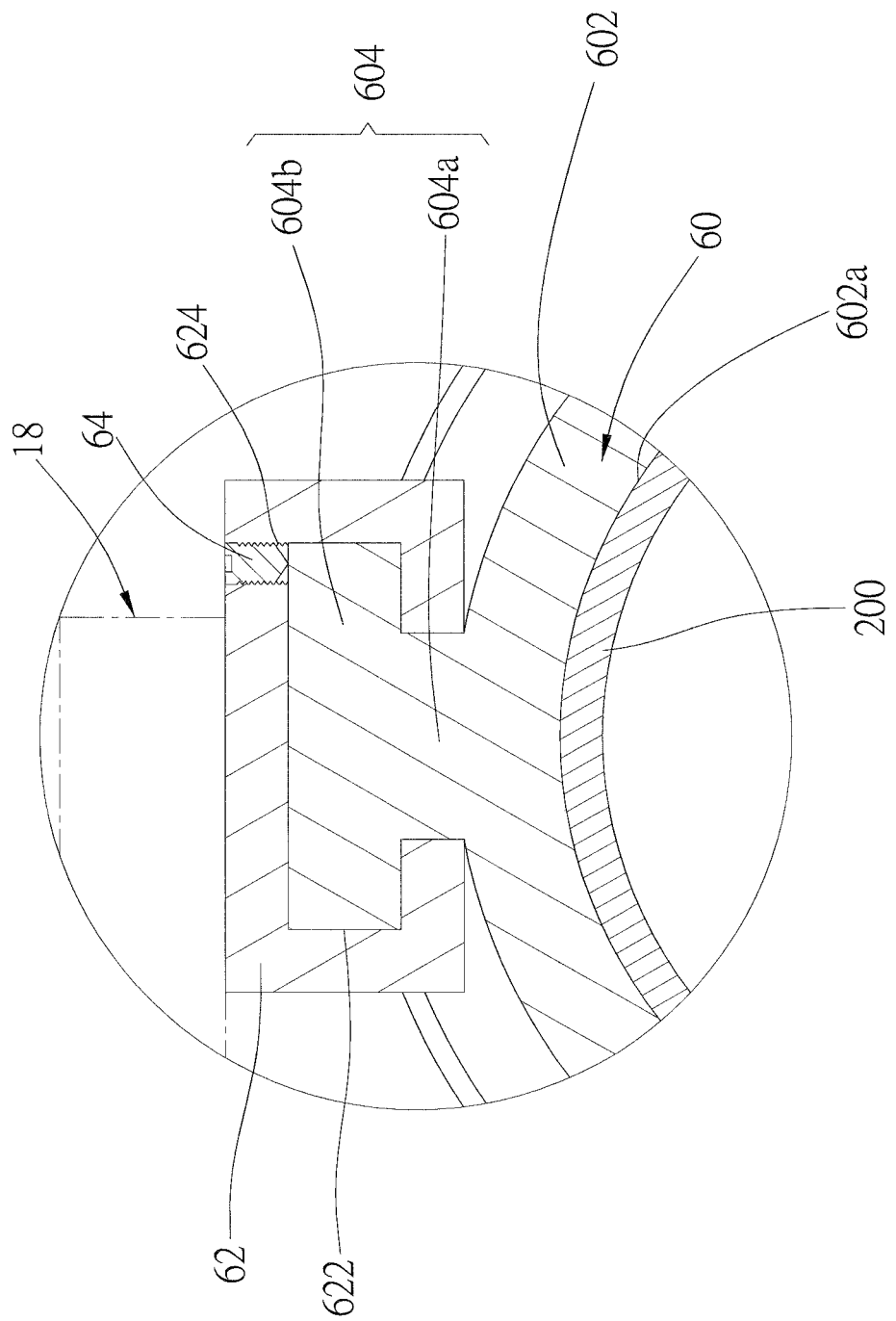
FIG. 8 is a sectional view of a fourth preferred embodiment of the present invention, showing alternative sliding member and mounting frame.

As shown in FIG. 8, a mounting frame 60 includes a main frame 602 and a plurality coupling rails 604 which extend in an axial direction of the main frame 602. Hereafter we take one of the coupling rails 604 as an example for explanation. The main frame 602 has a central hole 602a fitted on the handlebar 200. The coupling rails 604 are arranged in different radial directions of the central hole 602a, and each of the coupling rails 604 has a neck 604a and a head 604b, wherein the neck 604a is extended from a peripheral surface of the main frame 602. A sliding member 62 is provided for engaging the light 18, wherein the sliding member 62 has a coupling slot 622 which is complementary to the coupling rail 604 in shape. The coupling slot 622 is fitted into the coupling rail 604 through an end of the coupling rail 604, and the sliding member 62 is movable along the coupling rail 604. Similarly, the sliding member 62 is firmly engaged onto the mounting frame 60 by screwing a bolt 64 into a threaded hole 624 of the sliding member 62 and abutting the bolt 64 against the head 604b of the coupling rail 604.

Figure 9:
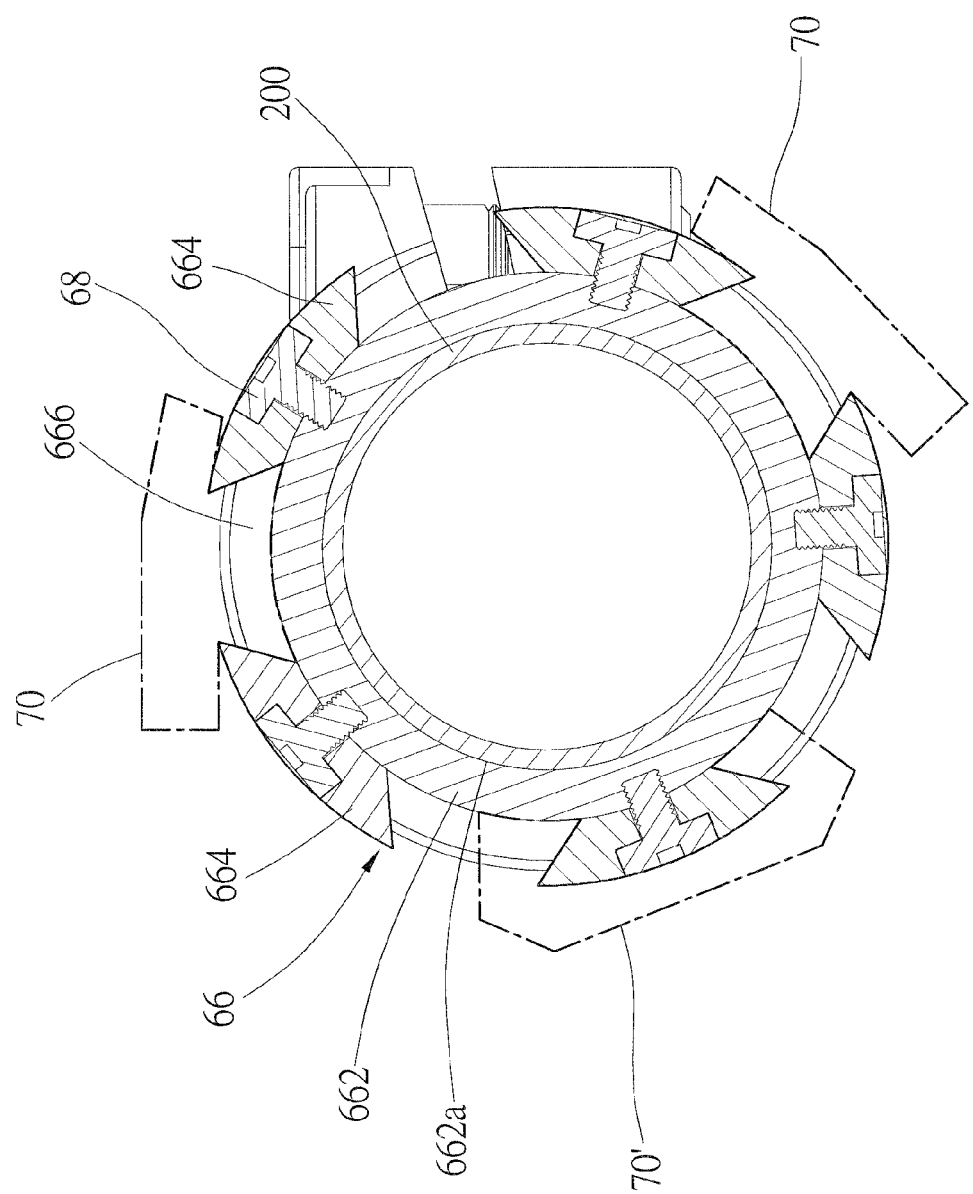
FIG. 9 is a sectional view of a fifth preferred embodiment of the present invention, showing alternative sliding member and mounting frame.

As shown in FIG. 9, a mounting frame 66 includes a main frame 662 and a plurality of coupling rails 664, wherein the main frame 662 has a central hole 662a. The coupling rails 664 are engaged to the main frame 662 by a plurality of bolts 68, and are arrange in different radial directions of the central hole 662a. Each of the coupling rails 664 is gradually getting narrower from top to bottom, and a coupling slot 666 is formed between two neighboring coupling rails, wherein the coupling slot 666 is wider at a bottom thereof. Whereby, the mounting frame 66 can engage two different kinds of sliding members 70, 70', wherein the sliding member 70 is engaged in one of the coupling slots 666, and the sliding member 70' is engaged to one of the coupling rails 664.

Figure 10:
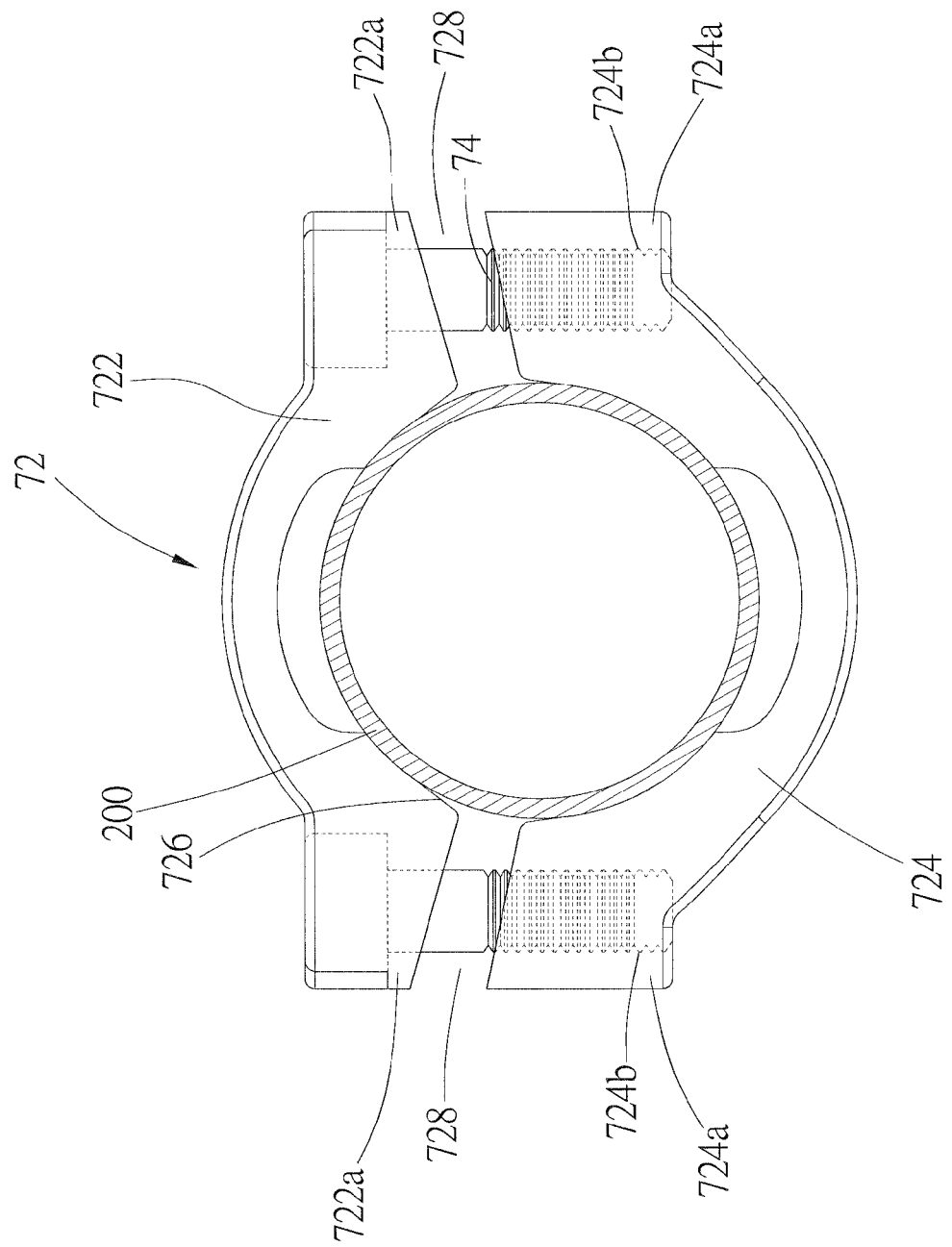
FIG. 10 is a schematic diagram of a sixth preferred embodiment of the present invention, showing an alternative mounting frame.

As shown in FIG. 10, a mounting frame 72 includes a first main frame 722 and a second main frame 724 which are engaged with each other to form a central hole 726 therebetween. The first main frame 722 and the second main frame 724 respectively have two opposite ends, wherein the ends of the first main frame 722 respectively have a first holding portion 722a, and the ends of the second main frame 724 respectively have a second holding portion 724a which corresponds to one of the first holding portions 722a. A gap 728 is respectively formed between each of the first holding portions 722a and the corresponding second holding portion 724a. With two pressing members, which are two bolts 74 in the preferred embodiment, respectively screwed into a threaded hole 724b of one of the second holding portions 724a through one of the first holding portions 722a, a width of each of the gaps 728 can be narrowed by urging each of the first holding portions 722a to move towards the corresponding second holding portion 724a. As a result, the first main frame 722 and the second main frame 724 hold the handlebar 200 together, and therefore the mounting frame 72 is firmed mounted on the handlebar 200.

Figure 11:
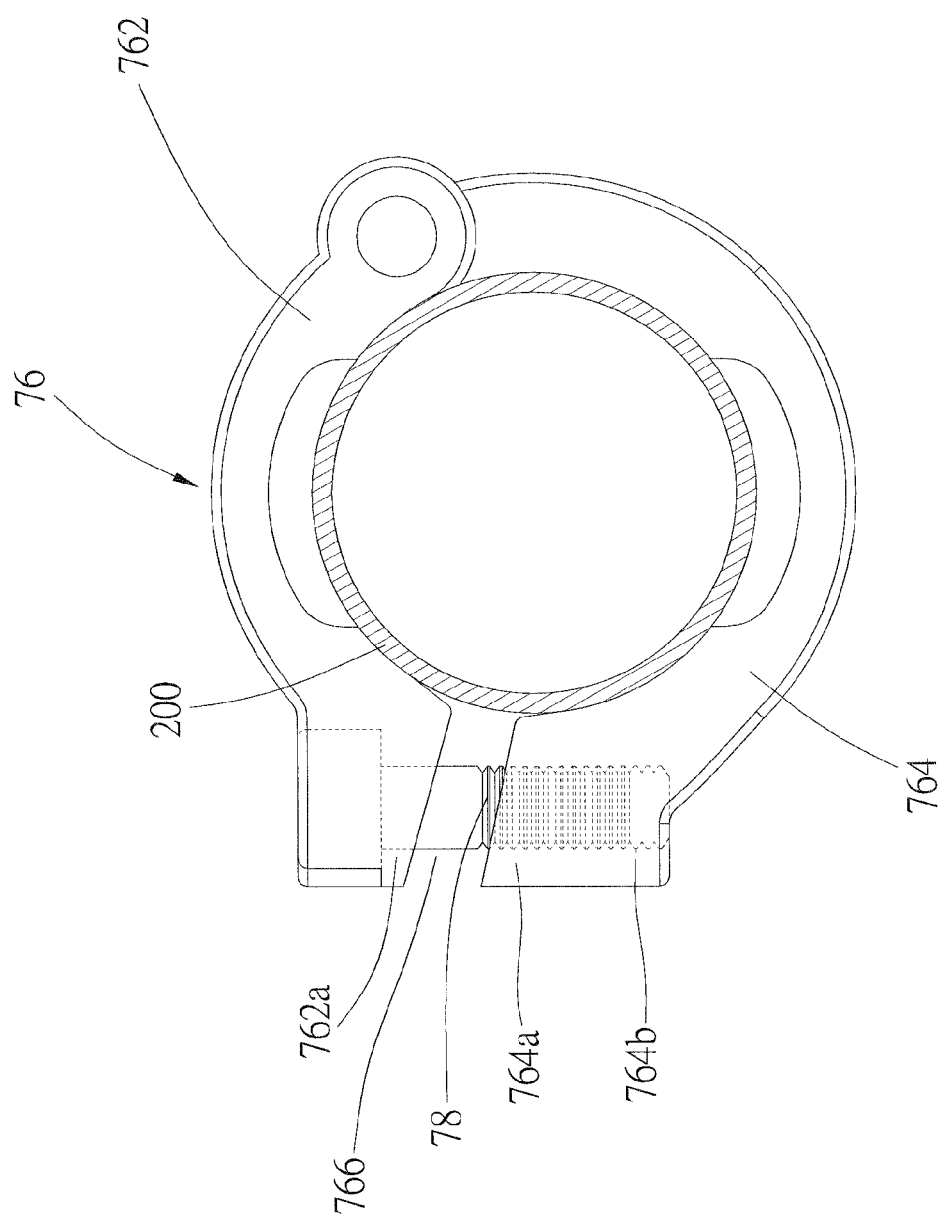
FIG. 11 is a schematic diagram of a sixth preferred embodiment of the present invention, showing an alternative mounting frame.

As shown in FIG. 11, a mounting frame 76 similarly includes a first main frame 762 and a second main frame 764, except that one of the two opposite ends of the first main frame 762 is pivotally connected to the second main frame 764, and the other end of the first main frame 762 has a holding portion 762a, while the second main frame 764 has another holding portion 764a. A gap 766 is formed between the holding portions 762a, 764a. With a bolt 78 screwed into a threaded hole 764b of the holding portion 764a of the second main frame 764 through the holding portion 762a of the first main frame 762, the first main frame 762 and the second main frame 764 can hold the handlebar 200 together to firmly mount the mounting frame 76 on the handlebar 200.

In conclusion, the accessories are around the frame member and firmly mounted on the handlebar. Besides, the coupling slots are longer than the sliding members, and the sliding members could be secured at any position within the coupling slots.

The description above is a few preferred embodiments of the present invention and the equivalence of the present invention is still in the scope of claim construction of the present invention.

What is claimed is:

1. A mounting frame, which is connected to a handlebar of a bicycle for mounting accessories thereon, comprising:
   a frame member;
   the frame member comprising a central hole and a plurality of coupling slots;
   the central hole allowing the handlebar to be inserted thereinto;
   the coupling slots being provided on a surface of the frame member in different radial directions around the central hole;
   the coupling slots each comprising an elongated direction;
   the elongated direction being parallel to an axial direction of the central hole;
   each of the coupling slots allowing a bicycle accessory to be engaged therewith;
   the frame member further comprising two holding portions and at least one opening;
   the two holding portions forming a gap therebetween;
   the gap and the at least one opening communicating with the central hole;
   the gap comprising two opposite ends extending to one of the at least one opening and an end of the frame member respectively; and
   a pressing member;
   the pressing member being connected to the two holding portions to narrow a width of the gap.

2. The mounting frame as defined in claim 1, wherein one of the holding portions has a hole, and the other holding portion has a threaded hole; the pressing member comprises a bolt, which is screwed into the threaded hole through the hole; the width of the gap is narrowed by screwing the bolt, which has a head abutting against one of the holding portions, and said holding portion is forced to move towards the other holding portion.

3. The mounting frame as defined in claim 1, wherein the pressing member comprises a press handle and a connecting rod, which has two end; a nut is provided at one of the ends of the connecting rod; the connecting rod passes through the two holding portions with the end provided with the nut, and the nut abuts against one of the holding portion; the press handle has a head pivotally connected to the other end of the connecting rod, wherein the head abuts against the other holding portion; the width of the gap is narrowed by pressing the press handle to push the holding portions.

4. The mounting frame as defined in claim 1, wherein the frame member further comprises a first main frame and a second main frame engaged together to form the central hole therebetween, wherein the first main frame has two opposite ends, one of the ends is pivotally connected to the second main frame, and the other end has one of the holding portions; the second main frame has the other holding portion.

5. The mounting frame as defined in claim 1, wherein the frame member further comprises a main frame and a plurality of coupling rails, wherein the main frame has the central hole; the coupling rails are provided on the main frame, and are arranged in different radial directions around the central hole; each of the coupling slots is formed between two neighboring coupling rails.

6. The mounting frame as defined in claim 1, wherein the frame member further comprises a first main frame, a second main frame and another pressing member, wherein the first main frame and the second main frame are engaged together to form the central hole therebetween; the first main frame and the second main frame respectively have two opposite ends; the two ends of the first main frame respectively have one of the holding portions, and the two ends of the second main frame respectively have the other holding portion; the gap is respectively formed between the two corresponding second holding portions; each one of the pressing members passes through one of the gaps; the width of each of the gaps is narrowed by pressing each of the pressing members to urge the corresponding two holding portions to move towards each other.

7. A mounting frame, which is connected to a handlebar of a bicycle for mounting accessories to be mounted thereon, comprising:
- a main frame having a central hole, which allows the handlebar to be inserted thereinto; and
- at least two coupling rails, which extends in an axial direction of the main frame, and are arranged in different radial directions around the central hole; each of the coupling rails has a neck and a head, wherein the neck is connected onto a peripheral surface of the main frame; the coupling rails allow bicycle accessories to be engaged therewith.

8. An accessory assembly of a bicycle, which is connected to a handlebar of a bicycle, comprising:
- a mounting frame;
- the mounting frame comprising a central hole and a plurality of coupling slots;
- the central hole allowing a handlebar of a bicycle to be inserted thereinto;
- the plurality of coupling slots being distributed on a surface of the mounting frame in different radial directions around the central hole;
- the plurality of coupling slots comprising a plurality of dovetail slots;
- a derailleur controller;
- the derailleur controller comprising a base;
- the base comprising a sliding member;
- the sliding member comprising a dovetail-shaped coupling portion;
- the dovetail-shaped coupling portion being complementary to the plurality of coupling slots for being detachably engaged in one of the plurality of coupling slots;
- the mounting frame comprising a pressing member and two holding portions;
- the two holding portions forming a gap therebetween;
- the pressing member being connected to the two holding portions to narrow a width of the gap; and
- the gap communicating with the central hole.

9. The accessory assembly as defined in claim 8, wherein one of the holding portions has a hole, and the other holding portion has a threaded hole; the pressing member comprises a bolt, which is screwed into the threaded hole through the hole; the width of the gap is narrowed by screwing the bolt, which has a head abutting against one of the holding portions, and said holding portion is forced to move towards the other holding portion.

10. An accessory assembly of a bicycle, which is connected to a handlebar of a bicycle, comprising:
- a mounting frame comprising a central hole and a plurality of coupling slots;
- the central hole allowing a handlebar of a bicycle to be inserted thereinto;
- the plurality of coupling slots being distributed on a surface of the mounting frame in different radial directions around the central hole;
- the plurality of coupling slots comprising a plurality of dovetail slots;
- a brake lever;
- the brake lever comprising a sliding member;
- the sliding member comprising a dovetail-shaped coupling portion;
- the dovetail-shaped coupling portion being complementary to the plurality of coupling slots for being detachably engaged in one of the plurality of coupling slots;
- the mounting frame comprising a pressing member and two holding portions;
- the two holding portions forming a gap therebetween;
- the pressing member being connected to the two holding portions to narrow a width of the gap; and
- the gap communicating with the central hole.

11. The accessory assembly as defined in claim 10, wherein one of the holding portions has a hole, and the other holding portion has a threaded hole; the pressing member comprises a bolt, which is screwed into the threaded hole through the hole; the width of the gap is narrowed by screwing the bolt, which has a head abutting against one of the holding portions, and said holding portion is forced to move towards the other holding portion.

* * * * *